US009405429B1

(12) United States Patent
Gopalakrishnan

(10) Patent No.: US 9,405,429 B1
(45) Date of Patent: Aug. 2, 2016

(54) COLLECTING ITEMS WITH MULTI-TOUCH GESTURES

(71) Applicant: Amazon Technologies, Inc., Reno, NV (US)

(72) Inventor: Manikandan Gopalakrishnan, Tamil Nadu (IN)

(73) Assignee: AMAZON TECHNOLOGIES, INC., Reno, NV (US)

( * ) Notice: Subject to any disclaimer, the term of this patent is extended or adjusted under 35 U.S.C. 154(b) by 72 days.

(21) Appl. No.: 13/710,164

(22) Filed: Dec. 10, 2012

(51) Int. Cl.
*G06F 3/048* (2013.01)
*G06F 3/0481* (2013.01)
*G06F 3/0488* (2013.01)

(52) U.S. Cl.
CPC ............ *G06F 3/0481* (2013.01); *G06F 3/0488* (2013.01); *G06F 2203/04104* (2013.01); *G06F 2203/04808* (2013.01)

(58) Field of Classification Search
CPC .............. G06F 2203/048; G06F 3/042; G06F 2203/04808; G06F 3/017; G06F 3/041; G06F 3/0482–3/04886; G06F 2203/04104
See application file for complete search history.

(56) References Cited

U.S. PATENT DOCUMENTS

| | | | | |
|---|---|---|---|---|
| 2002/0080180 | A1* | 6/2002 | Mander et al. | 345/769 |
| 2007/0229471 | A1* | 10/2007 | Kim et al. | 345/173 |
| 2008/0170776 | A1* | 7/2008 | Albertson et al. | 382/154 |
| 2009/0307623 | A1* | 12/2009 | Agarawala et al. | 715/765 |
| 2010/0020221 | A1* | 1/2010 | Tupman et al. | 348/333.01 |
| 2011/0246918 | A1* | 10/2011 | Henderson | G06F 3/04817 715/769 |
| 2011/0252375 | A1* | 10/2011 | Chaudhri | G06F 3/04817 715/835 |
| 2012/0079404 | A1* | 3/2012 | Chen et al. | 715/765 |
| 2012/0180003 | A1* | 7/2012 | Sawayanagi et al. | 715/863 |
| 2013/0014041 | A1* | 1/2013 | Jaeger | 715/765 |
| 2013/0145321 | A1* | 6/2013 | Horiuchi et al. | 715/830 |

* cited by examiner

*Primary Examiner* — Claudia Dragoescu
(74) *Attorney, Agent, or Firm* — Sutherland Asbill & Brennan LLP

(57) ABSTRACT

This disclosure relates to systems and methods for collecting content items displayed on a user device and combining them into a folder using a multiple finger gesture. The user device may also use a multiple finger gesture to disassociate the content items from the folder. In other embodiments, the user device may use a combination of gestures and voice commands to collect or disassociate content items.

26 Claims, 7 Drawing Sheets

COLLECTING ITEMS WITH MULTI-TOUCH GESTURES

BACKGROUND

User devices can store large amounts and different types of content that may be viewed or played by a user. The amount and diversity of content may overwhelm users trying to find specific content or groups of related content. Smaller displays may add to the difficulty in sorting through large amounts of content. Hence, users may want to use techniques that help organize and manage their content.

Figure 1:
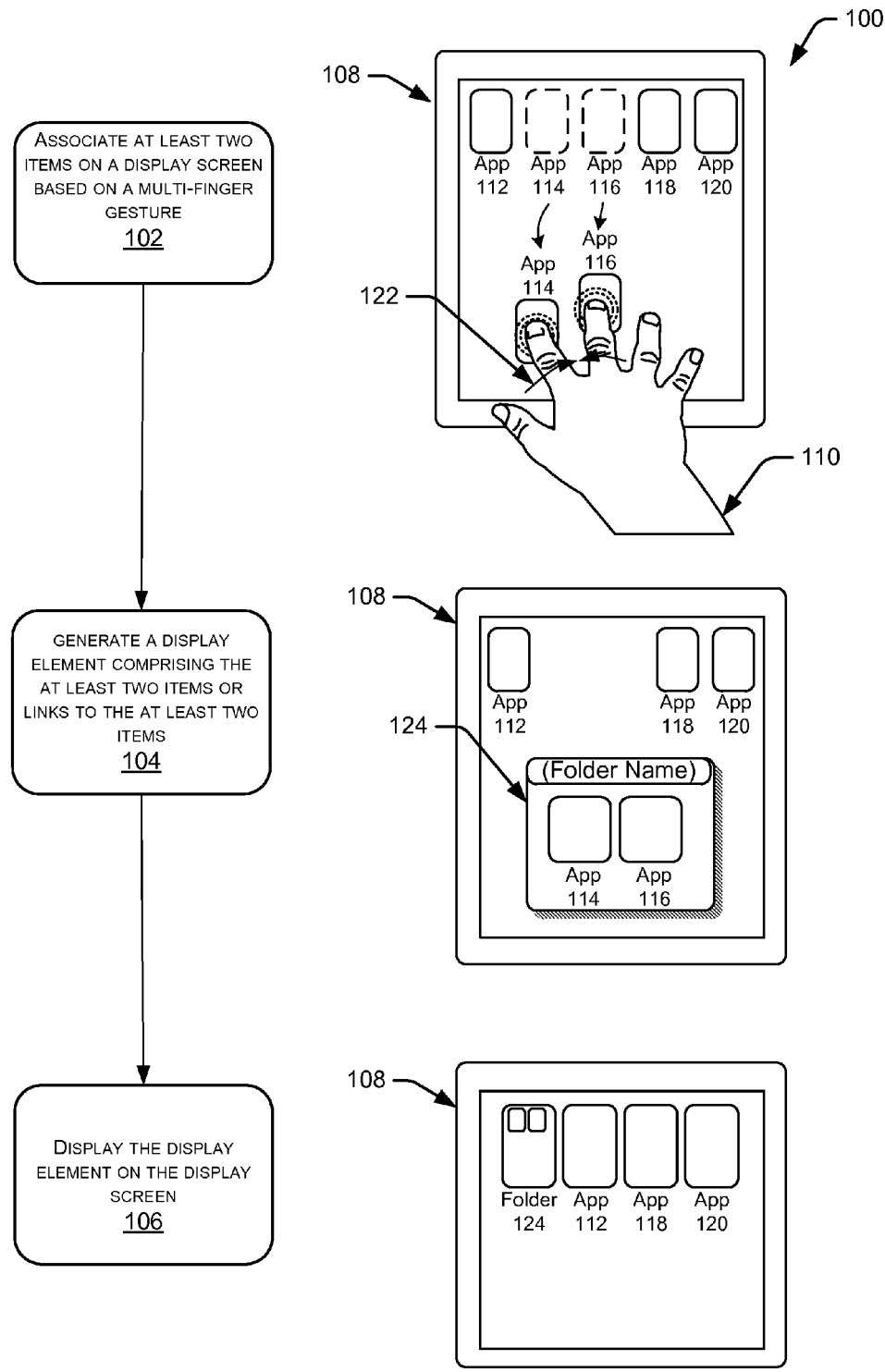
FIG. 1 illustrates a method for collecting content items into a folder using a multiple finger gesture that may be detected by a user device in accordance with one or more embodiments of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Described herein are systems and methods for collecting or organizing content, interfaces, icons, or applications on a user device using a multi-finger gesture that may be detected by the user device.

A user device may include several interfaces that enable a user to navigate through applications, content, and/or files stored on the user device. In one specific example, a desktop interface may each include several icons for different types of applications that may be executed by the user device. The desktop interface may include several icons that may not be displayed on a single desktop interface. In this case, the desktop interface may include several segments that may include icons. The user may scroll through the desktop interfaces to find an application that may be executed by the user device. The desktop interfaces may include, but are not limited to, content libraries, application libraries, or a user desktop that may include icons.

In another display embodiment, application icons may be displayed in a tiered arrangement that enables at least one of the icons to be selected for execution or to be opened. The remaining application icons may be accessed for selection by scrolling through the application icons until the application icon is placed in a position so that the application icon may be selected or opened by the user. The application icons may include, but are not limited to, applications, content, documents, or music files.

In another display embodiment, an application or content item may include several pages that may be displayed separately from the other segments, pages. The user may need to scroll from page to page to access a desired application or content item. The user may scroll back and forth between pages as desired. The applications may include, but are not limited to, games, communication interfaces, service provider interfaces, retail interfaces, social media interfaces, or information (e.g., news) interfaces. The content items may include, but are not limited to, books, periodicals, pictures, news feeds, status updates, or informational items.

The user device may gesture detection components that may interpret hand or finger gestures made or in proximity to the user device. The gestures may be used to collect or combine content items into a single icon, folder, or any other identifier that may store the content items or references to those content items.

In one embodiment, the gesture may include multiple fingers that each used to select one content item that may be combined with other content items selected by the fingers. The content items may be selected by placing a finger on an icon or other identifier for a content item. In one specific embodiment, the index and middle fingers may each select content item for collection. A folder may be generated when the index and middle fingers move towards each other and the content items may be stored in the folder or references to the content items may be stored in the folder. The user may be prompted to name (e.g., games) the folder and the folder or an icon representing the folder may be displayed by the user device. In another embodiment, the user may use three or more fingers to collect items into a folder. For example, a five finger gesture may be used to select five content items and combine them into a folder when the fingers are move towards each other.

In another embodiment, the user device may collect content items from multiple pages that may not be concurrently displayed. For example, the user device may include a large amount of items that may use several pages to display all of the items. In one instance, the user may want to combine content items that are located on different pages. The user may collect items from the first page and create a folder as described above. However, the user device may detect another user interaction that enables the user to scroll to a second page and combine second page content items into the folder with the first page content items. The user interaction may include, but is not limited to, pushing a button or performing a hand gesture enabling the multi-page content collection capability.

In another embodiment, the user device may separate items from a folder when a multiple finger gesture is detected. The folder may include two or more content items that are stored or referenced in the folder. The folder may be displayed on the user device and may be selected by a user. In one instance, the folder may be selected by using a multiple finger gesture that makes contact or is in proximity to the user device. When the multiple fingers are moved away from each other the content items may be displayed on the user device without the folder identifier or folder designation.

In another embodiment, the user device may generate a folder by using a combination of hand gestures and verbal commands. For example, the user device may detect a multiple finger gesture that selects two or more content items. The user device may detect a collection verbal command that enables the user device to generate a folder and attach the two or more content items to the folder. In another instance, the folder may be disbanded by selecting the folder using a two or more fingers and detect a dispersal verbal command that disbands or disassociates the content items from the folder. In this instance, the content items may be displayed individually without reference to the folder The user device may detect gestures in a variety of ways that may include the user gesture making contact with the user device or the user gesture being performed in proximity to the user device. In one instance, the user gesture being performed within proximity of the user device may not include making physical contact with the user device. The gesture detection components may include, but are not limited to, touch, imaging, infrared, electromagnetic, and/or ultrasonic sensors to detect the user gestures.

Illustrative Methods

FIG. 1 illustrates a method 100 for collecting content items displayed on a user device 108 and storing them in a folder 124. The collection of the content items may be implemented, at least in part, on a multi-finger gesture used to select content items and to generate a folder. FIG. 1 illustrates a two finger embodiment, but the disclosure is not limited to two fingers and may include two or more fingers.

At block 102, a user may use their hand 110 to select two or more applications from a plurality of applications 112, 114, 116, 118, 120. In one instance, the selected applications 114, 116 may be related to one another in some manner. For example, the content items may include the same type of content, same artist, same genre, or any other similarity that may be recognized by the user. In one specific embodiment, the selected applications 114, 116 may include, but are not limited to, books or games created by the same author, publisher, and/or developer. The illustrated embodiment shows two fingers are used to select the applications 114, 116, however, in other embodiments the user may select up to at least five applications using five fingers.

In one embodiment, the user may move their fingers 122 together indicating the two applications 114, 116 may be associated with each other. The user device may create a reference that links the two applications 114, 116 together.

Although FIG. 1 indicates the applications 114, 116 are moved down towards the lower part of the display before they are combined, this is only one embodiment of the collection of content items. In other embodiments, the applications may be selected and moved towards each other without having to be moved prior to the fingers moving towards each other.

At block 104, the user device 108 may generate a folder 124 that represents the linking of the applications 114, 116 together. The user device 108 may prompt the user for a folder name (e.g., games) to generate a folder/icon that may include the two applications 114, 166 or at least references to the two applications 114, 116.

At block 106, the user device 108 may display the folder 124 on the display screen in place of the applications 114, 116 that were included in the folder. The folder 124 icon may indicate the type of applications in the folder by the name of the folder or by graphic representations of the applications 114, 116 as shown in FIG. 1.

Figure 2:
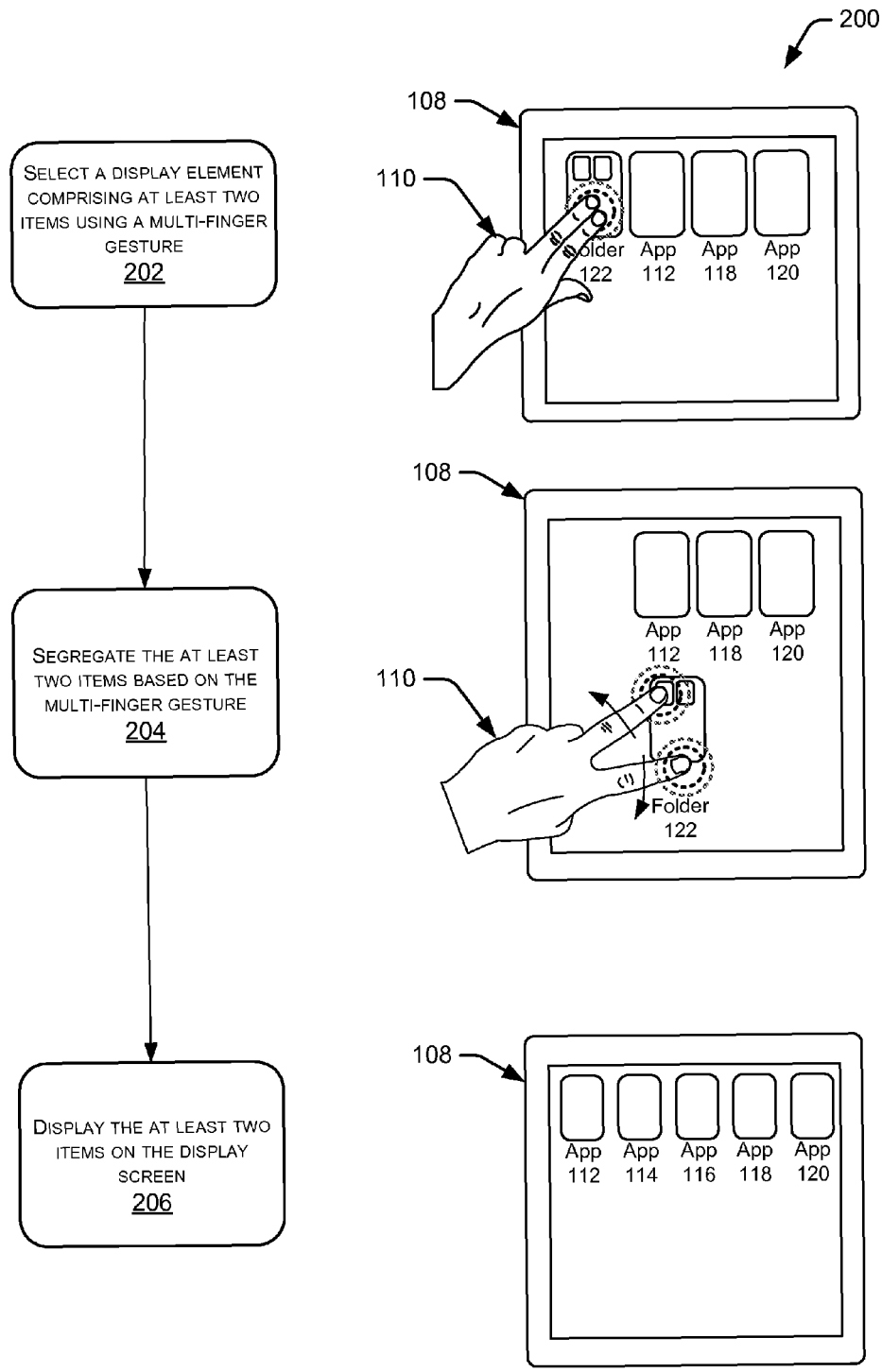
FIG. 2 illustrates a method for removing content items from a folder using a multiple finger gesture that may be detected by a user device in accordance with one or more embodiments of the disclosure.

FIG. 2 illustrates a method 200 for removing content items (e.g., applications 114, 116) from a folder 124 using a multiple finger gesture that may be detected by the user device 108. In certain instances, individual content items may need to be disassociated from a folder 124 assignment. This disassociation may enable the content items to be displayed separately independently from the folder 124.

At block 202, the user device 108 may determine a multiple finger gesture from a user's hand 110 may be selecting a folder 124. The multiple finger gesture may include two or more fingers that make physical contact or is at least in proximity to the user device 108. In one embodiment, the fingers may be touching each other when the folder 124 is selected. In another embodiment, the fingers may be slightly apart from each other when the folder 124 is selected.

At block 204, the user device 108 may determine the two or more fingers of the gesture are moving away from each other. This gesture may include, but is not limited to, the fingers spreading apart from each other in that a distance between the tips of fingers increases. The separation of the fingers may trigger the dissolution of the folder 124 and/or may direct the user device 108 to disassociate the relationship between the folder 124 and the applications 114, 116 that were stored or referenced in the folder 124.

In another embodiment, the separation of the fingers may include a velocity or acceleration component to the gesture. In this instance, the user device 108 may determine how fast the fingers are moving away from each other and may trigger the folder 124 dissolution when the speed/acceleration of the fingers exceeds a threshold amount.

In another embodiment, the separation of the fingers may also be dependent upon the pressure applied by the fingers in a touch display embodiment. For example, the dissolution gesture may include the finger separation while the fingers are applying pressure above threshold amount. In this instance, when the fingers are separated while applying a suitable pressure to the display, the user device 108 may implement the folder 124 dissolution.

In the illustrated embodiment in FIG. 2, the hand 110 moves the folder 124 to the center of the user device 108 display and separates the fingers. However, the finger separation gesture may also be done where the folder 124 is selected as illustrated in block 202. The user device may implement folder dissolution in either location. The user may implement the gesture where the folder 124 is located on the display or move the folder to another location and implement the folder 124 dissolution gesture at that location.

In another embodiment, the user device 104 may prompt the user to select which items to remove from the folder instead of deleting the entire folder. One or more items in the folder may be selected to be removed from the folder and the remaining items may continue to reside in the folder. The items that removed from the folder may be displayed independently of the folder. In this embodiment, the folder 124 may be continued to be displayed and not deleted.

In one embodiment, the item removal selection may include a list of the items in the folder that is presented to the user. The user selects which items may be removed from the folder. The selection may include a touch or non-touch gesture or a verbal command. For example, the list of items may include a reference letter or numeral that the user utters to make the selection. The user may utter "select items one and three" or "select items A and B." In another embodiment, the user may utter the file name to make the selection.

At block 206, the user device 108 may display the applications 114, 116 on the display without referencing the folder following the implementation of the folder 124 dissolution gesture. As shown in FIG. 2, the applications 114, 116 may be displayed independently of the folder 124 and of each other.

Figure 3:
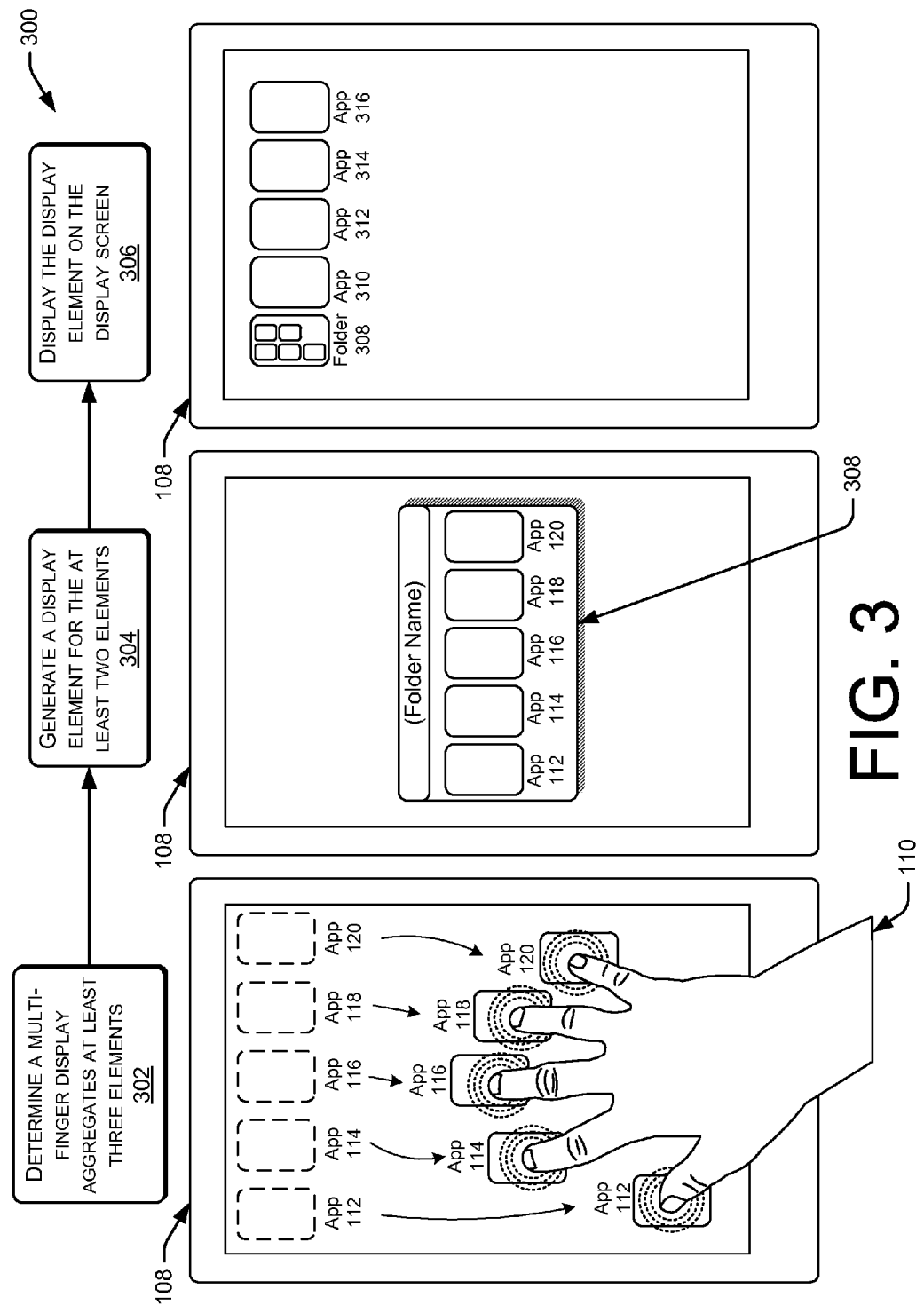
FIG. 3 illustrates another method for collecting three or more content items into a folder using a multiple finger gesture that may be detected by a user device in accordance with one or more embodiments of the disclosure.

FIG. 3 illustrates another method 300 for collecting three or more content items into a folder 124 using a multiple finger gesture that may be detected by a user device 108. Method 300 applies the concept of content item collection to three or more fingers, in contrast to FIG. 1 which illustrates the collection of two content items using two fingers.

At block 302, a user may use their hand 110 to select three or more applications from a plurality of applications 112, 114, 116, 118, 120. In one instance, the selected applications 112, 114, 116, 118, 120 may be related to one another in some manner. For example, the content items may include the same type of content, same artist, same genre, or any other similarity that may be recognized by the user. In one specific embodiment, the selected applications 112, 114, 116, 118, 120 may include, but are not limited to, books or games created by the same author, publisher, and/or developer. The illustrated embodiment shows five fingers are used to select five applications 112, 114, 116, 118, 120; however, in other embodiments the user may select three applications using three fingers or four applications using four fingers.

In one embodiment, the user may move their fingers 122 together indicating the applications 112, 114, 116, 118, 120 may be associated with each other. The user device may create a reference that links the applications 112, 114, 116, 118, 120 together.

Although FIG. 3 indicates the applications 112, 114, 116, 118, 120 are moved down towards the lower part of the display before they are combined, this is only one embodiment of the collection of content items. In other embodiments, the applications may be selected and moved towards each other without having to be moved prior to the fingers moving towards each other.

At block 304, the user device 108 may generate a folder 308 that represents the linking of the applications 112, 114, 116, 118, 120 together. The user device 108 may prompt the user for a folder name (e.g., games) to generate a folder/icon that may include the applications 112, 114, 116, 118, 120 or at least references to the applications 112, 114, 116, 118, 120.

At block 306, the user device 108 may display the folder 308 on the display screen in place of the applications 112, 114, 116, 118, 120 that were included in the folder 308. The folder 308 icon may indicate the type of applications in the folder by the name of the folder or by graphic representations of the applications 112, 114, 116, 118, 120 as shown in FIG. 3. Additionally, other applications 310, 312, 314, 316 may backfill the space where the other applications 112, 114, 116, 118, 120 were being displayed. In one instance, the other applications 112, 114, 116, 118, 120 may have been designated to be displayed on another page, but were enabled to be displayed on this page due to availability created by assigning the applications 112, 114, 116, 118, 120 to the folder 308.

Figure 4:
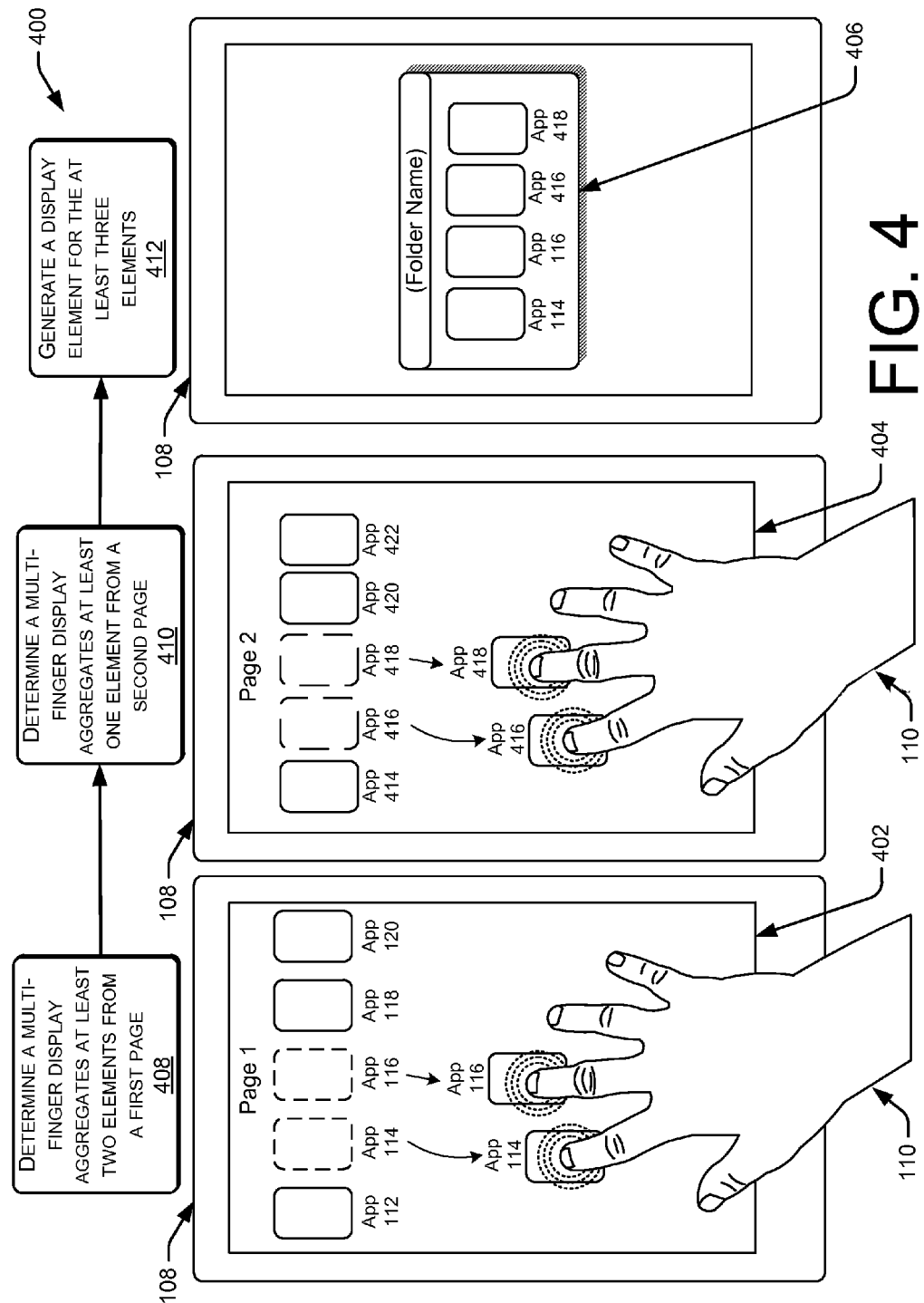
FIG. 4 illustrates a method for collecting content from multiple pages and assigning the content items to a folder using a multiple finger gesture that may be detected by a user device in accordance with one or more embodiments of the disclosure.

FIG. 4 illustrates a method 400 for collecting content items (e.g., applications 114, 116, etc.) from multiple pages (e.g., page 402, page 404) and assigning the content items to a folder 406 using a multiple finger gesture that may be detected by a user device 108.

At block 408, a user may use their hand 110 to select two or more applications from a plurality of applications 112, 114, 116, 118, 120. In one instance, the selected applications 114, 116 may be related to one another in some manner. For example, the content items may include the same type of content, same artist, same genre, or any other similarity that may be recognized by the user. In one specific embodiment, the selected applications 112, 114, 116, 118, 120 may include, but are not limited to, books or games created by the same author, publisher, and/or developer. The illustrated embodiment shows two fingers are used to select two applications 114, 116; however, in other embodiments the user may select three or more applications using three or more fingers as needed.

In this embodiment, the applications 112, 114, 116, 118, 120 may reside on a first page 402 that may not be able to display all of the content items or applications that are available to be collected together. In certain instances, the user may want to collect additional content items or applications that are not currently displayed on the first page 402. The user device 108 may receive or detect a user interaction that may indicate the user wants to enable the selection of content items or applications on a second page 404 or another portion of the first page 402 that may not be currently visible. The user interaction may be detected prior to or following the selection of the applications 114, 116 on the first page 402. For example, the user interaction may occur before or after the fingers are moved together.

In one embodiment, the user interaction may include engaging a button (e.g., home page button (not shown)), switch, or any other mechanical device that may be selected or engaged by the user. In another embodiment, the user interaction may include, but is not limited to, engaging an icon or element displayed by the user device 108. For example, in the illustrated embodiment, the user may select another icon using their thumb, ring, or pinky finger to display the second page 404. In another embodiment, the user interaction may include a finger or hand gesture that may trigger the displaying of the second page 404. For example, the gesture may include rotating the selected applications 114, 116 clockwise or counter clockwise to display the second page 404. In another embodiment, the user interaction may include moving the hand 110 and the selected applications 114, 116 to the left, right, up, or down depending on where the other content items or applications may be located. For example, when the hand 110 is moved to the right, this gesture may enable the second page 404 to be displayed. Likewise, when the hand moves to the left, another page may be displayed. In another instance, the up and down hand 110 movements may enable scrolling of the first page 402 up and down to display additional content items or applications.

At block 410, the user device 108 enable a second page 404 with additional applications 414, 416, 418, 420, 422, as noted in the discussion block 408. The user device 108 may determine that two or more applications 414, 416 may be selected to be associated with the two or more applications 114, 116 from the first page 402. The selection may include determining a multiple finger gesture using two or more fingers may be used to select the applications 416, 418.

At block 412, the user device 108 may generate the folder 406 and may include the applications 114, 116, 416, 418 in the folder 406. The applications 114, 116, 416, 418 may be stored in the folder or referenced to the folder 406 in some manner. Accordingly, the applications 114, 116, 416, 418 may not be displayed independently of the folder 406. The user device 108 may also prompt the user to assign a name to the folder 406 or may generate name based on a naming convention stored on the user device 108. The name may also be generated based on the type, or other attribute, of the applications 114, 116, 416, 418.

In other embodiment, the user device 108 may generate the folder after the first group of applications 114, 116 are selected. The user device may determine that additional applications 416, 418 may also be selected to be placed in a folder. When the user device 108 has determined group folder user interaction has occurred, the additional applications may be included in the folder 406. In another instance, the user device 108 may prompt the user to add the additional applications 416, 418 to an existing folder 406 or to generate a new folder (not shown) to store the additional applications 416, 418.

Figure 5:
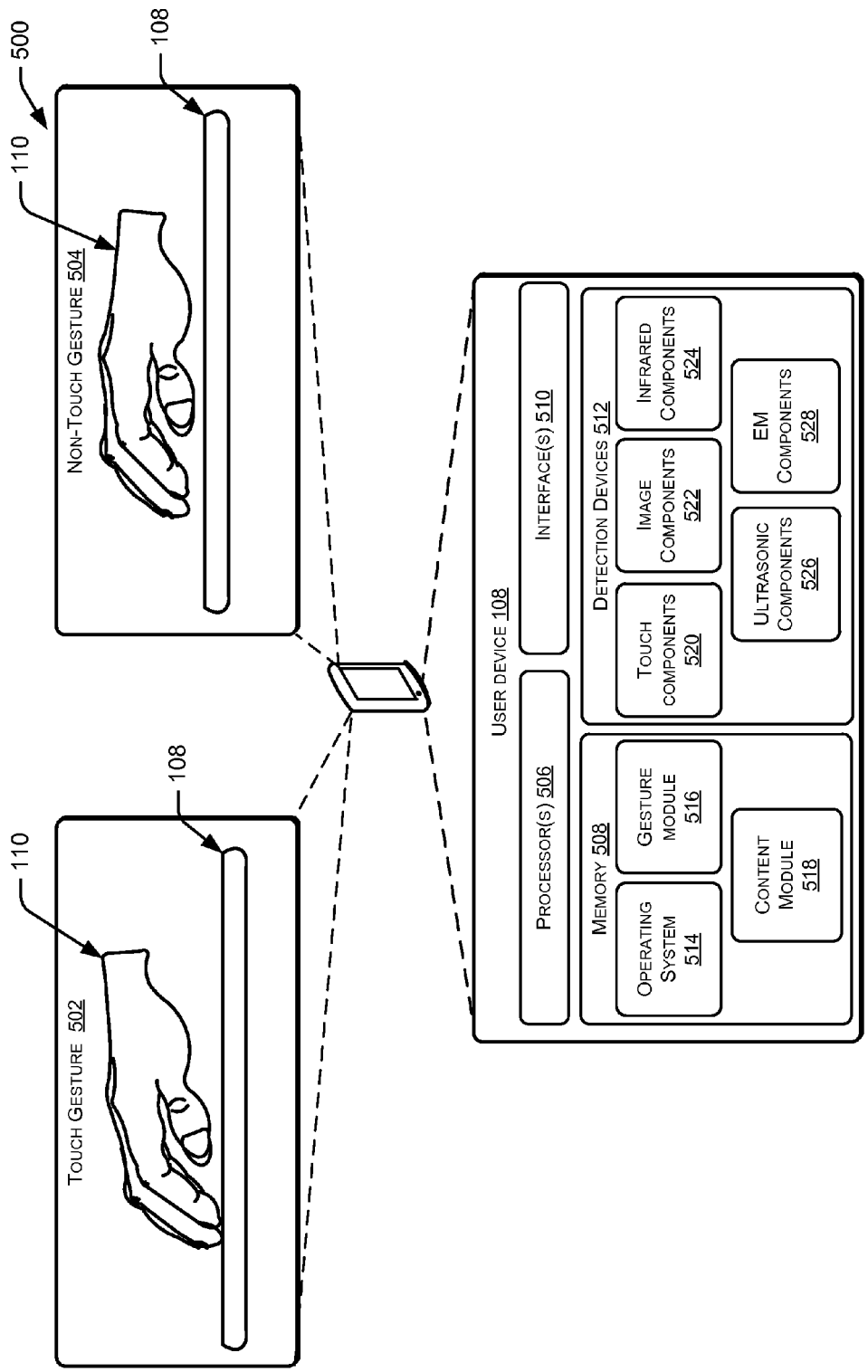
FIG. 5 illustrates a system used to implement multiple finger gesture content collection techniques in accordance with one or more embodiments of the disclosure.

FIG. 5 illustrates a system 500 used to collect content items using multiple finger gesture techniques. The gestures may include a touch gesture 702 that may include fingers of a hand 110 that are placed in contact with the user device 108. The gesture may include a non-touch gesture 504 that may include fingers of a hand 110 that may be placed in proximity to the user device 108, but not physically touching the user device 108. The user device 108 may include, but is not limited to, smartphones, mobile phones, laptop computer, desktop computer, tablet computers, televisions, set-top boxes, game consoles, in-vehicle computer systems, and so forth.

Although the user device 108 is illustrated as single device, the components that implement the content collection may be implemented across several devices (not shown) that are electrically coupled to each other by wires or wirelessly. Hence, the system 500 may not need to have the display and gesture detection components integrated together into a single device. For example, the display may be a standalone component like a television or projector display image. The gesture detection component may be a camera or touch pad that is managed by a separate computer processing device that may also be in communication with the standalone display.

The user device 108 may include one or more processors 506, a memory 508, and one or more network and input/output interfaces 510, and detection devices 512.

The computer processors 506 may comprise one or more cores and are configured to access and execute (at least in part) computer-readable instructions stored in the one or more memories 508. The one or more computer processors 506 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 108 may also include a chipset (not shown) for controlling communications between the one or more processors 506 and one or more of the other components of the user device 108. In certain embodiments, the user device 108 may be based on an Intel® architecture or an ARMO architecture and the processor(s) 506 and chipset may be from a family of Intel® processors and chipsets. The one or more processors 506 may also include one or more application-specific integrated circuits (ASICs) or application-specific standard products (ASSPs) for handling specific data processing functions or tasks.

The network and I/O interfaces 510 may also comprise one or more communication interfaces or network interface devices to provide for the transfer of data between the user device 108 and another device (e.g., network server) via a network (not shown). The communication interfaces may include, but are not limited to: personal area networks ("PANs"), wired local area networks ("LANs"), wireless local area networks ("WLANs"), wireless wide area networks ("WWANs"), and so forth. In FIG. 5, the user device 108 may be coupled to the network via a wired connection. However, the wireless system interfaces may include the hardware and software to broadcast and receive messages either using the Wi-Fi Direct Standard (See; Wi-Fi Direct specification published in October 2010) and or the IEEE 802.11 wireless standard (See; IEEE 802.11-2007, published Mar. 8, 2007; IEEE 802.11n-2009, published October 2009) or a combination thereof. The wireless system (not shown) may include a transmitter and a receiver or a transceiver (not shown) capable of operating in a broad range of operating frequencies governed by the IEEE 802.11 wireless standards. The communication interfaces may utilize acoustic, radio frequency, optical or other signals to exchange data between the user device 108 and another device such as an access point, a host computer, a server, a router, a reader device, and the like. The network may include, but is not limited to: the Internet, a private network, a virtual private network, a wireless wide area network, a local area network, a metropolitan area network, a telephone network, and so forth.

The one or more memories 508 comprise one or more computer-readable storage media ("CRSM"). In some embodiments, the one or more memories 508 may include non-transitory media such as random access memory ("RAM"), flash RAM, magnetic media, optical media, solid state media, and so forth. The one or more memories 508 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 508 may store an operating system 514 that includes a plurality of computer-executable instructions that may be implemented by the processor 506 to perform a variety of tasks to operate the interface(s) 510 and any other hardware installed on the user device 108. The memory 506 may also include a gesture module 516 and/or a content module 518. The user device 108 may also include detection devices 512 to detect the touch gestures 502 or non-touch gestures 504.

The gesture module 516 may receive information from one or more detection devices 512 to determine which type of gesture is being made by the hand 110 of the user. In conjunction with the content module 518, the gesture module 516 may determine which elements displayed on the user device 108 may be impacted by the gesture information.

Broadly, the gesture information may indicate a type of gesture, an orientation of the gesture, and/or an implementation of the gesture. The type of gesture may include, but is not limited to, a touch gesture 502 in which the hand 110 of the user makes physical contact with the user device 108. The touch gesture 502 may include one or more fingers that make contact with a display screen or another portion of the user device 108. In another embodiment, the type of gesture may be a non-touch gesture 504 that may include a hand 110 gesture made in proximity of the user device 108. The non-touch gesture 504 may also include one or more fingers that are moved in a manner to control or manage the user device 108.

The orientation of the gesture may be based, at least in part, on the number of fingers being used, the direction of the movement, the acceleration of the movement, and/or the force of the movement. The orientation of the gesture may include, but is not limited to, a two finger gesture 106, a three finger gesture 202, a four finger gesture 302, or a five finger gesture 402. The gesture module 516 may receive information to determine the amount of fingers the hand 114 is using to make the gesture. The information may also include the direction gesture and the orientation of the fingers. For example, the information may indicate when the fingers are pressed together, when the fingers are held apart, and/or when the fingers are moved together or separated from each other.

The gesture module 516 may also determine the implementation of gestures with respect to managing or controlling the user device 108. In one embodiment, the gesture module 516 may determine which aspect of the user device 108 the user may be attempting to control or manage. For example, as in FIG. 1, the user device 108 may be displaying applications 112, 114, 116, 118, 120. The gesture module may determine an amount of fingers being used and which application(s) may be being selected for collection. These multiple finger embodiments are described in greater detail in the descriptions of FIGS. 1-4.

The content module 518 may store the content that is displayed by the user device 108. This content may include, but is not limited to, documents, applications, icons, games, music, videos, social media interfaces, or any other type of content that may be stored or communicated electronically. The content module 518 may also provide location information of the items as they are displayed on the display screen of the user device 108. The location information may be used by the gesture module 516 to determine which displayed items may be impacted by the hand gesture. For example, the content module 518 may applications 112, 114, 116, 118, 120 location information to assist the gesture module 516 on which application may be enabled for selection.

The user device 108 may use one or more detection devices 512 to detect the type, orientation, and/or the implementation of the hand 110 gesture. The detection devices 512 may include, but is not limited to, touch components 520, image components 522, infrared components 524, ultrasonic components 526, and/or electromagnetic components 528.

The touch components 520 may be incorporated into the display screen of the user device 108. However, the touch components 520 may also be incorporated into the surface of the user device 108, which may not include the display screen. The touch components 520 may include pressure sensitive elements that may be able to determine how many fingers are in physical contact with the user device 108. They may also determine the direction, pressure, and/or distance between the fingers when the fingers are sliding across the surface and/or in physical contact with the user device 108. In one embodiment, the touch components may include a capacitive sensing device that may detect the presence of one or more fingers when the fingers are coupled (e.g., touching the screen) with the touch components.

The image components 522 may be able to detect electromagnetic radiation within the visible light spectrum of 390 nm-750 nm. The image components 522 may be used to generate one or more images of the hand 110 and fingers to determine the number of fingers, the orientation of the fingers, and/or the direction of the hand/finger movements. The one or more images may be analyzed separately or a as a group to determine the type and orientation of the hand 110 gesture. The image components 522 may include, but are not limited to, a camera, a complementary metal oxide (CMOS) image sensor, or a charge coupled device (CCD) image sensor. The image components 522 may be any device that converts an optical image into an electrical signal.

The infrared components 524 may detect to detect electromagnetic radiation within the infrared light spectrum of 750 nm-1 mm. The infrared components 522 may be used to generate one or more images of the hand 110 and fingers to determine the number of fingers, the orientation of the fingers, and/or the direction of the hand 110 movements. The infrared components 524 may be arranged to detect the hand 110 gesture whether the gesture includes or does not include physical contact with the user device 108. The one or more images may be analyzed separately or a as a group to determine the type and orientation of the hand 110 gesture. The infrared components 524 may include, but are not limited to, a pyroelectric sensor that generates an electrical charge when exposed to heat in the form of electromagnetic radiation.

The ultrasonic components 526 may detect hand 110 gestures using radio or sound waves that are emitted by the user device 108 (or another device) and that are received at the user device 108 (or another device) after being reflected off of the hand 110 and/or fingers. The ultrasonic components 526 may include, but are not limited to, piezoelectric components that generate an electrical signal when a force or wave is applied to them. The ultrasonic components 526 may detect the hand 110 gesture that is contact with or not in contact with the user device 108.

The electromagnetic components 528 that may detect electromagnetic fields that may be generated by the user device 108 (or another device) that are modulated by the presence of the hand 110 and fingers in the electromagnetic field. The user device 108 may be able to determine the orientation and type of the hand 110 gesture to include the number of fingers and their movement near or on the user device 108.

Figure 6:
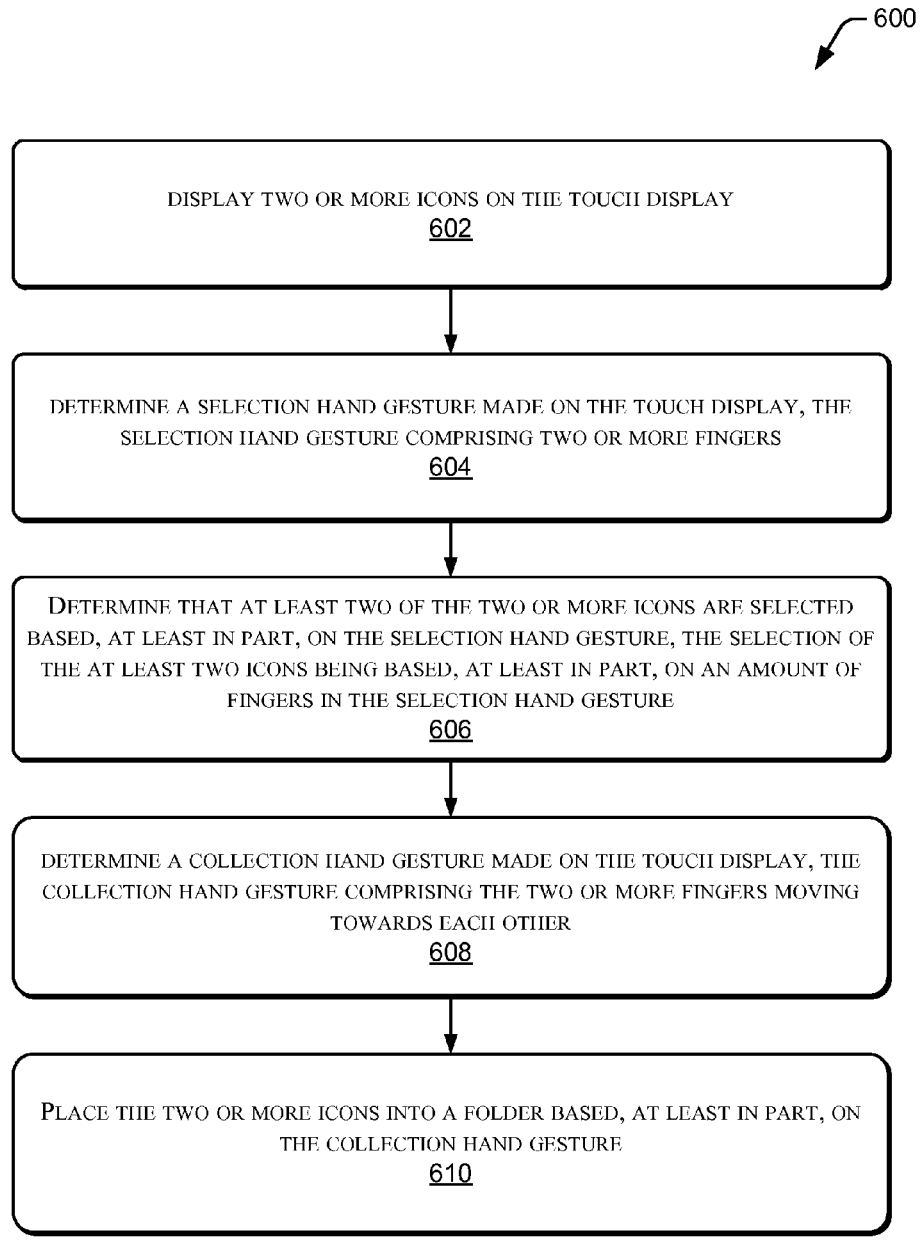
FIG. 6 illustrates a flow diagram for a method for collecting content items into a folder using a multiple finger gesture that may be detected by a user device in accordance with one or more embodiments of the disclosure.

FIG. 6 illustrates a flow diagram for a method 600 for collecting content items into a folder 124 using a multiple finger gesture that may be detected by a user device 108. The method 600 may be implemented as described above in the discussions of FIGS. 1-6.

At block 602, the user device 108 may display two or more icons (e.g., applications 112, 114, 116, 118, 120) or elements on a touch display. The icons may represent an applications, content, or documents that may be stored on the user device 108 or accessible by the user device 108 over a network. For example, this may include games, books, periodicals, web pages, word processing documents, math processing documents, social media applications, music files, video files, or any other type of document that may be stored or displayed by the user device 108.

At block 604, the user device 108 may determine a selection hand gesture made on the touch display made by a user. The selection hand gesture may include two or more fingers that make contact with the user device 108. The hand gesture may include the two or more fingers of the user's hand 110. The hand gesture may be made in proximity to the icons displayed by the user device 108. In one embodiment, the hand gesture may make physical contact with the user device 108. In another embodiment, the hand gesture may be above, adjacent, or subjacent to the user device 108. In this instance, the hand gesture may not make physical contact with the user device 108.

In one embodiment, the selection hand gesture may include using a single finger to select multiple elements. The user may utter a verbal command to enable the selection of multiple elements one at a time using a single finger or two or more at a time using more than one finger.

At block 606, the user device 108 may determine that at least two of the two or more icons are selected based, at least in part, on the selection hand gesture. The selection of the at least two icons being based, at least in part, on an amount of fingers in the selection hand gesture. For example, when the gesture includes two fingers, the selection may include two icons. The user may also select three icons using three fingers, one finger for each icon. The gesture may also include four or five fingers to select four or five icons respectively.

At block 608, the user device 108 may determine a collection hand gesture is made on the touch display. The collection hand gesture may include moving the two or more fingers towards each other. In one embodiment, moving towards each other may include moving the tips of the fingers closer to each other. In another embodiment, moving towards each other may include the sides of the finger touching each other at the completion of the gesture.

At block 610, the user device 108 may place the two or more elements into a folder 124 which may include the two or more icons (e.g., applications 114, 116) or references to the two or more icons. The folder 124 may be a preexisting folder or a new folder. In the preexisting folder embodiment, the folder 124 may be selected based, at least in part, on a common characteristic between the two or more elements. For example, the elements may be related to one another based, at least in part, on content, genre, authorship, or format. For example, the content may include similar performers that are included the elements. This may also include similar features within the content such as scenery, location, color, or sound. This elements may be movies that are in black in white instead of color. In another instance, the content of the elements may include references to the same or similar locations. Another common characteristic may be related to the genres of the elements. When the elements are music files, this may include determining the music is related to rock, jazz, rap, or country western. However, the elements genre may also pertain to movies, games, television shows, applications, or any other type of electronic content. Authorship may include, but is not limited to, a person or organization (e.g., band, company, publisher, etc.) that generated or created the elements. For example, this may include song writer who wrote a song or it may include a band that performed the song, a producer that produced the song, or an engineer that engineered the song. In another instance, authorship may also include a distributor of the elements. The format of the elements may also be a common characteristic. The format may include the file format (e.g., mpeg, quicktime, windows media) or a more generic format that may pertain to the type of element. The generic format may include, but is not limited to, a text file, an audio file, a video file, a game, or an application.

In the new folder embodiment, the folder generation may include determining a name for the folder 124 via a naming convention stored in memory or receiving the name via an input interface of the user device 108. The user device may display the folder 124 and the name of the folder on the touch display.

In one embodiment, the folder 124 may include a portion of memory 508 that stores the two or more elements or a reference to a memory location associated with the two or more elements. The folder 124 may also be viewed as a container that stores the elements. The container may be an assigned to a portion of the memory 508.

In another embodiment, the user device 108 may determine that the user wants to disassociate the icons from the folder 124. This may include displaying the icons independently from the folder 124, such that the user may not want to store the icons in the folder 124 any longer.

This method embodiment may include the user device determining the folder 124 being selected based, at least in part, on another multiple finger gesture. This gesture may include two or more fingers that are placed at least in proximity to the folder 124. The user device 108 may determine the other multiple finger gesture includes the two or more fingers moving apart from one another. This determination may be made based, at least in part, on a distance between the tips of the finger is increasing or a distance between the points of contact by the fingers on the user device 108 are increasing. Following the gesture determination, the user device 108 may display the two or more icons associated with the folder 124 independent of the folder.

In another embodiment, the user may want to collect other icons (e.g., applications 416, 418) that may not be concurrently displayed with the currently displayed icons (e.g., applications 114, 116). In this instance, the user device 108 may enable the collection of non-displayed icons when the user performs a user interaction that indicates additional items may include the folder 406. The user interaction may include, but is not limited to, pushing a button, selecting an icon, or implementing a hand/finger gesture as described in the discussion of FIG. 4.

In one embodiment, the user device 108 may determine a user interaction is made on or at least in proximity to the user device 108. In instance, the user interaction may include, but is not limited to, pressing a home button (not shown) for the user device 108. A second page 406 may be displayed on the user device as a result of the user interaction. The second page 406 may include two or more icons (e.g., applications 414, 416, 418, 420, 422).

The user device 108 may determine that two or more second page elements are selected based, at least in part, on another multiple finger gesture being made at least in proximity to the system. The user device 108 may then determine that the two or more elements are moved towards one another based, at least in part, on finger moving toward each other. Based, at least in part, on the aforementioned gesture the user device 108 may add the two or more second page elements (e.g., applications 416, 418) to the folder 406 that also include the first page elements (e.g., applications 114, 116).

Figure 7:
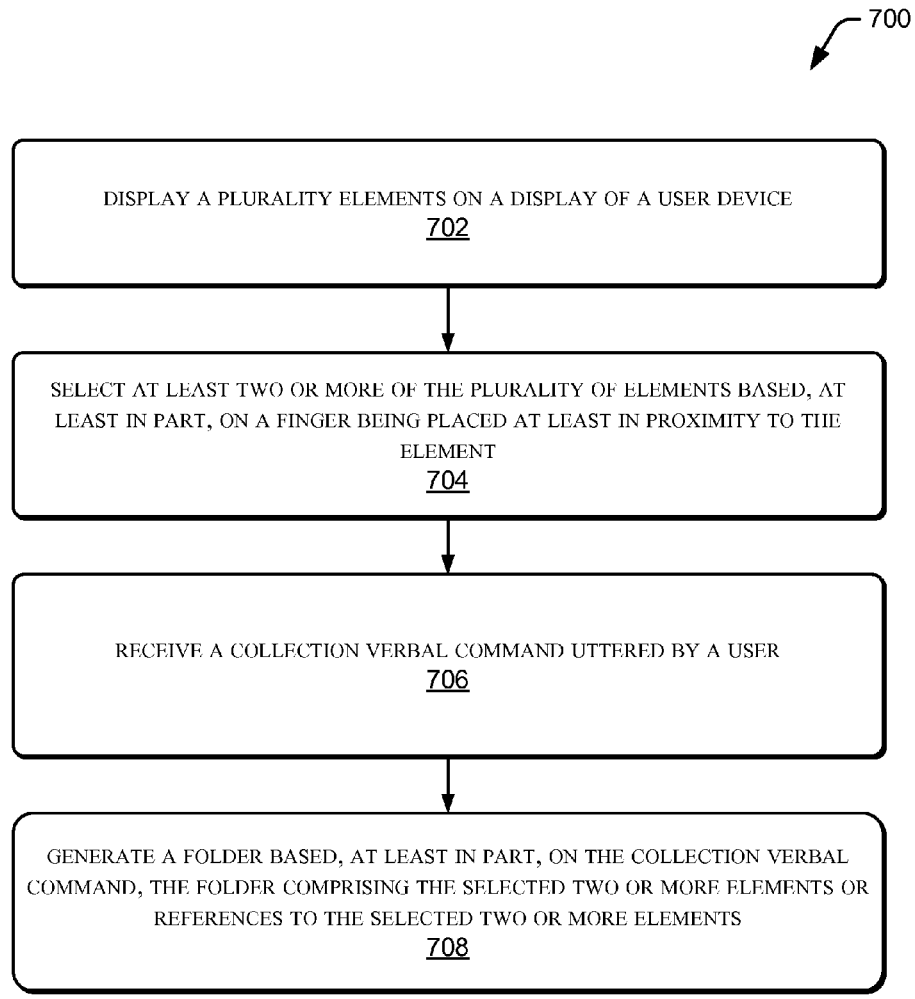
FIG. 7 illustrates a flow diagram for another method for collecting content items into a folder using a multiple finger gesture and a verbal command that may be detected by a user device in accordance with one or more embodiments of the disclosure.

FIG. 7 illustrates a flow diagram for another method 700 for collecting content items into a folder using a multiple finger gesture and a verbal command that may be detected by a user device 108.

At block 702, the user device 108 may display a plurality elements or icons on a display.

At block 704, the user device 108 may selecting at least two or more of the plurality of elements based, at least in part, on fingers being placed at least in proximity to at least two the elements. The two or more finger gesture may make contact with the user device 108 or placed in proximity to the elements displayed by the user device 108.

At block 706, the user device 108 may receive a collection verbal command uttered by a user. The utterance may include any verbal command that has been assigned to combine two or more elements into a folder 124. For example, the utterance may include, but is not limited to, "combine," "add to folder," "create folder," "generate folder," or "add together."

At block 708, the user device 108 may generate a folder 124 based, at least in part, on the collection verbal command. The folder 124 may comprise the selected two or more elements or references to the selected two or more elements. Accordingly, the folder 124 may be displayed by the user device and may include a name that provides an indication of the content included in the folder.

In one embodiment, the user device 108 may receive a folder naming verbal command comprising a name for the folder. The folder name may be generated by a word, phrase, or alphanumeric phrase for the name.

In another embodiment, the user device 108 may determine a multiple finger gesture is applied to the folder on the touch display. The user device 108 may receive a dispersal verbal command uttered by the user. The utterance may include any verbal command that has been assigned to disassociate two or more elements from the folder 124. For example, the utterance may include, but is not limited to, "remove from folder," "separate," or "delete folder assignment." As a result, the user device 108 may display the two or more elements independent of the folder 124.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system, comprising:
   at least one memory that stores computer-executable instructions;
   at least one display; and
   at least one processor configured to access the at least one memory and execute the computer-executable instructions to:
   display two or more icons on the display;
   determine a first selection of a first icon of the two or more icons at a first location on the display based at least in part on detection of a first finger in proximity to the first location;
   determine a second selection of a second icon of the two or more icons at a second location on the display based at least in part on detection of a second finger in proximity to the second location;
   determine a collection hand gesture being made at least in proximity to the display while the first icon and the second icon are selected, the collection hand gesture comprising detection of the first finger moving towards the second finger;
   determine a folder is preexisting or new;
   when the folder is preexisting, select the folder based at least in part on a common characteristic between the two or more icons,
   when the folder is new, name the folder using a naming convention based at least in part, on the common characteristic between the two or more icons or prompt a user to input the name for the folder;
   place the two or more icons into the folder, based, at least in part, on the collection hand gesture; and
   display the folder with the two or more icons in the folder on the display.

2. The system of claim 1, wherein the selection hand gesture makes physical contact with the system.

3. The system of claim 1, further comprising an image sensor that detects the selection hand gesture or the collection hand gesture.

4. A system, comprising:
   at least one memory that stores computer-executable instructions;
   at least one display; and
   at least one processor configured to access the at least one memory and execute the computer-executable instructions to:
      determine a first selection of a first element of two or more elements at a first location on the at least one display based at least in part on detection of a first finger in proximity to the first location;
      determine a second selection of a second element of the two or more elements at a second location on the at least one display based at least in part on detection of a second finger in proximity to the second location;
      receive an indication that two or more elements are selected;
      receive a multiple finger gesture indicating that the selected first element and the second element are to be placed in a common folder while detecting the first element moving towards the second element;
      determine that the common folder is new;
      determine a name for the common folder using a naming convention based at least in part on a common characteristic between the two or more elements or prompt a user to input the name for the common folder;
      place the two or more elements in the common folder based, at least in part, on receiving the multiple finger gesture; and
      display the common folder with the two or more elements in the common folder using the at least one display.

5. The system of claim 4, further comprising computer-executable instructions to:
   determine the common folder is selected based, at least in part, on another multiple finger gesture;
   determine the other multiple finger gesture comprises two or more fingers moving apart from one another; and
   display the two or more elements of the common folder independent of the common folder.

6. The system of claim 4, wherein the multiple finger gesture comprises moving multiple fingers towards each other.

7. The system of claim 4, wherein the common folder comprises a new folder generated based, at least in part, on the receiving of the multiple finger gesture.

8. The system of claim 4, wherein the selection of the two or more elements being based, at least in part, on a single finger gesture that selects the two or more elements.

9. The system of claim 4, wherein the selection of the two or more elements being based, at least in part, on two or more fingers that selects the two or more elements.

10. The system of claim 4, wherein the multiple finger gesture comprises a touch touch-based gesture detected by the system.

11. The system of claim 4, wherein the multiple finger gesture being an air based gesture detected by the system.

12. The system of claim 4, further comprising a gesture detection component comprising one or more of the following:
   a touch sensor component; or
   an image sensing component.

13. A method comprising:
   determining, by a computing device, a first selection of a first element of two or more elements at a first location on a display based at least in part on detection of a first finger in proximity to the first location;
   determining a second selection of a second element of the two or more elements at a second location on the display based at least in part on detection of a second finger in proximity to the second location;
   determining, by the computing device, a hand gesture being made by a user while the first element and the second element are selected, the hand gesture comprising detection of the first finger moving towards the second finger
   determine a common folder that is preexisting based at least in part on a common characteristic between the two or more elements;
   placing, by the computing device, the first element and the second element in the common folder based, at least in part, on the hand gesture; and
   displaying, by the computing device, the folder with the first element and the second element in the common folder.

14. The method of claim 13, further comprising:
   determining the folder is selected based, at least in part, on another hand gesture;
   determining the other hand gesture comprises two or more fingers moving apart from one another; and
   displaying the two or more elements independent of the folder.

15. The method of claim 13, wherein the folder comprises a preexisting folder, and further comprising determining a selection the folder based, at least in part, on a common characteristic between the two or more elements that were selected.

16. The method of claim 15, wherein the common characteristic is based, at least in part, on content, genre, authorship, or format of the two or more elements.

17. One or more non-transitory computer-readable media storing computer-executable instructions that, when executed by at least one processor, configure the at least one processor to perform operations comprising:
   determining a first selection of a first element of at least two or more elements at a first location on a user device based at least in part on detection of a first finger in proximity to the first location;
   determining a second selection of a second element of the at least two or more elements at a second location on the user device based at least in part on detection of a second finger in proximity to the second location;
   determining the first element and the second element are moved towards one another based, at least in part, on a multiple finger gesture made at least in proximity to the user device, while the first element and the second element are selected;
   determining a folder that is new;
   determining a name for the folder using a naming convention based at least in part on a common characteristic between the two or more elements, or prompting the user to input the name for the folder;
   assigning the at least two or more elements to the folder based, at least in part, on the at least two or more elements being moved towards each other; and
   generating a display of the folder with the first element and the second element in the folder.

18. The computer-readable media of claim 17, further comprising determining a selection of the at least two or more of the elements based, at least in part, on at least one finger being placed at least in proximity to the two or more elements.

19. The computer-readable media of claim 17, further comprising determining a selection of the at least two or more elements based, at least in part, on a finger individually selecting the two or more elements.

20. The computer-readable media of claim 17, further comprising:
   determining the folder is selected based, at least in part, on another multiple finger gesture, wherein the other multiple finger gesture comprises two or more fingers moving apart from one another;
   determining a selection of at least one of the two elements to be removed from the folder; and
   displaying the at least one element independent of the folder and the folder.

21. The computer-readable media of claim 17, wherein the multiple finger gesture comprises at least two fingers moving towards each other.

22. One or more non-transitory computer-readable media storing computer-executable instructions that, when executed by at least one processor, configure the at least one processor to perform operations comprising:
   determining a first selection of a first element of two or more elements at a first location on a user device based at least in part on detection of a first finger in proximity to the first location;
   determining a second selection of a second element of the two or more elements at a second location on the user device based at least in part on detection of a second finger in proximity to the second location;
   receiving a collection verbal command uttered by a user to move the first element and the second element towards each other while the first element and the second element are selected; and
   determining that a folder is preexisting based at least in part on a common characteristic between the two or more elements; and
   selecting the folder based, at least in part, on the collection verbal command, the folder comprising the selected two or more elements or references to the selected two or more elements;
   generating a display of the folder with the two or more elements in the folder.

23. The computer-readable media of claim 22, further comprising:
   receiving a folder naming verbal command comprising a name for the folder; and
   displaying the folder or the name of the folder on a display.

24. The computer-readable media of claim 22, further comprising:
   determining a multiple finger gesture is applied to the folder on the display;
   receiving a dispersal verbal command uttered by the user; and
   displaying the two or more elements independent of the folder based, at least in part, on receiving the dispersal verbal command.

25. The computer-readable media of claim 22, wherein the user device comprises a microphone to receive the collection verbal command or the dispersal verbal command.

26. The computer-readable media of claim 22, wherein the elements comprise one or more of the following: a music file, a video file, a text document, a game, or an application.

* * * * *